(12) United States Patent
Giard

(10) Patent No.: US 8,317,517 B2
(45) Date of Patent: Nov. 27, 2012

(54) POTTY TRAINING DEVICE FOR BOYS

(76) Inventor: Louise Giard, St-Jean-Sur-Richelieu (CA)

( * ) Notice: Subject to any disclaimer, the term of this patent is extended or adjusted under 35 U.S.C. 154(b) by 330 days.

(21) Appl. No.: 12/825,711

(22) Filed: Jun. 29, 2010

(65) Prior Publication Data

US 2011/0318720 A1    Dec. 29, 2011

(51) Int. Cl.
*G09B 9/00* (2006.01)
(52) U.S. Cl. ...................................................... 434/247
(58) Field of Classification Search .................. 434/236, 434/237, 247, 258; 446/217, 232, 236, 266; D23/296, 297, 310
See application file for complete search history.

(56) References Cited

U.S. PATENT DOCUMENTS

| | | | |
|---|---|---|---|
| 2,703,407 A * | 3/1955 | Henoch et al. ................ 434/247 |
| 2,766,716 A * | 10/1956 | Mackey ...................... 116/67 R |
| 3,020,528 A * | 2/1962 | Swanson, Jr. et al. ............. 4/483 |
| 4,162,490 A * | 7/1979 | Fu et al. ........................ 340/603 |
| 5,031,253 A | 7/1991 | Brendlinger |
| 5,117,515 A | 6/1992 | White, Jr. |
| 5,343,577 A | 9/1994 | Petrovich |
| D366,931 S | 2/1996 | Blackburn |
| D382,336 S | 8/1997 | Truzzi |
| 5,890,242 A | 4/1999 | Minter |
| 5,926,867 A | 7/1999 | Buchanan |
| 6,183,850 B1 | 2/2001 | Lauer |
| D481,448 S * | 10/2003 | Argentina .................... D23/297 |
| 6,772,454 B1 | 8/2004 | Barry et al. |
| 6,908,392 B2 | 6/2005 | Friedman et al. |
| 7,017,198 B2 | 3/2006 | Conn et al. |
| 7,194,776 B1 | 3/2007 | Lastuka et al. |
| 7,353,549 B2 * | 4/2008 | Muir, Jr. ........................... 4/661 |
| 7,798,907 B2 * | 9/2010 | Piccionelli et al. ............. 463/49 |

* cited by examiner

*Primary Examiner* — Kurt Fernstrom

(57) ABSTRACT

A potty training device for use on toilets has a target releasably attached to a bent rod which is pivotally attached to a clamping means. The clamping means clamps onto a rim of a bowl. When an annular seat is lowered, it depresses a button which pivots the rod from the center of the bowl towards its side. When the annular seat is raised, the button is released and the rod rotates so as to bring the target towards the center of the bowl.

14 Claims, 4 Drawing Sheets

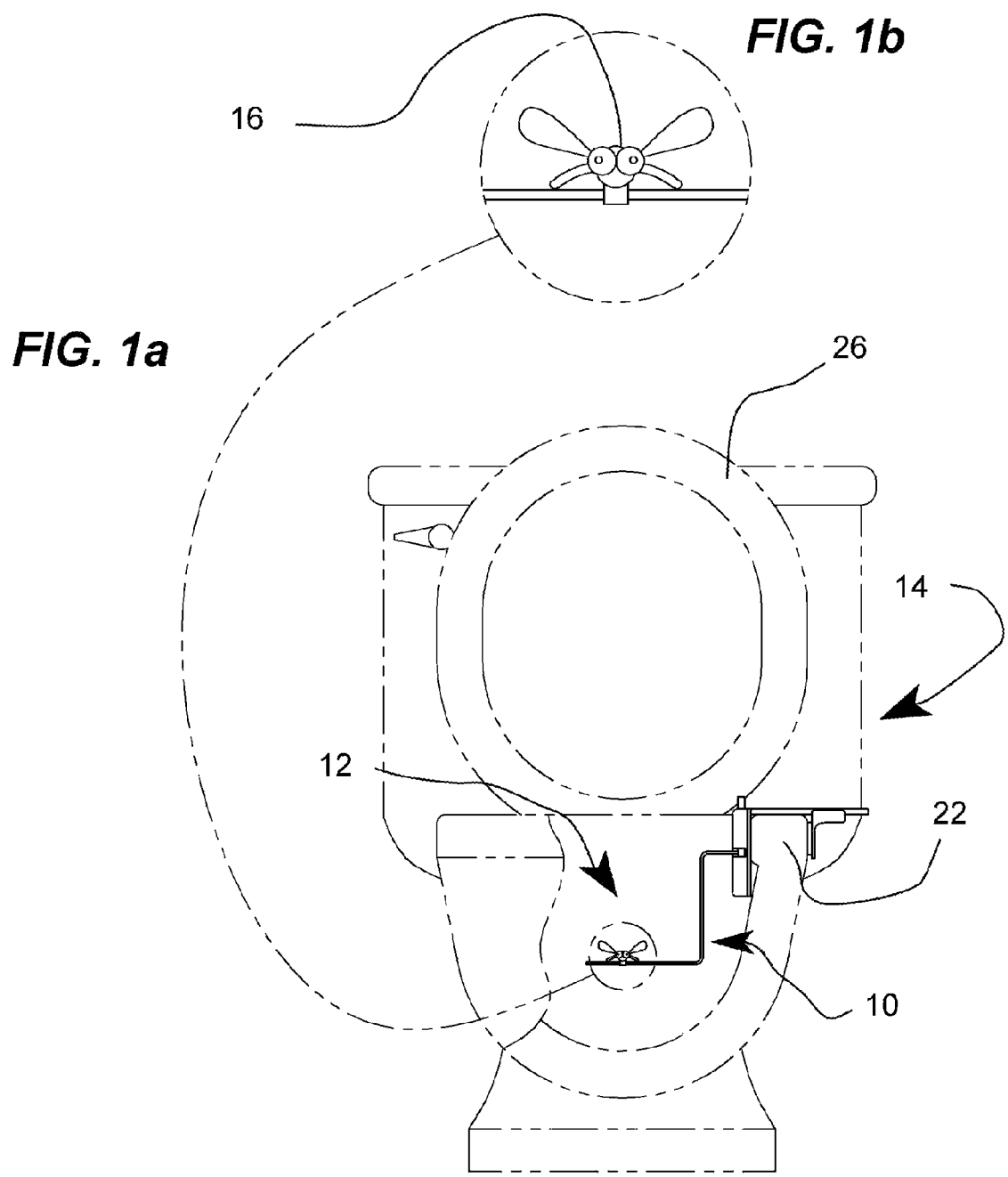

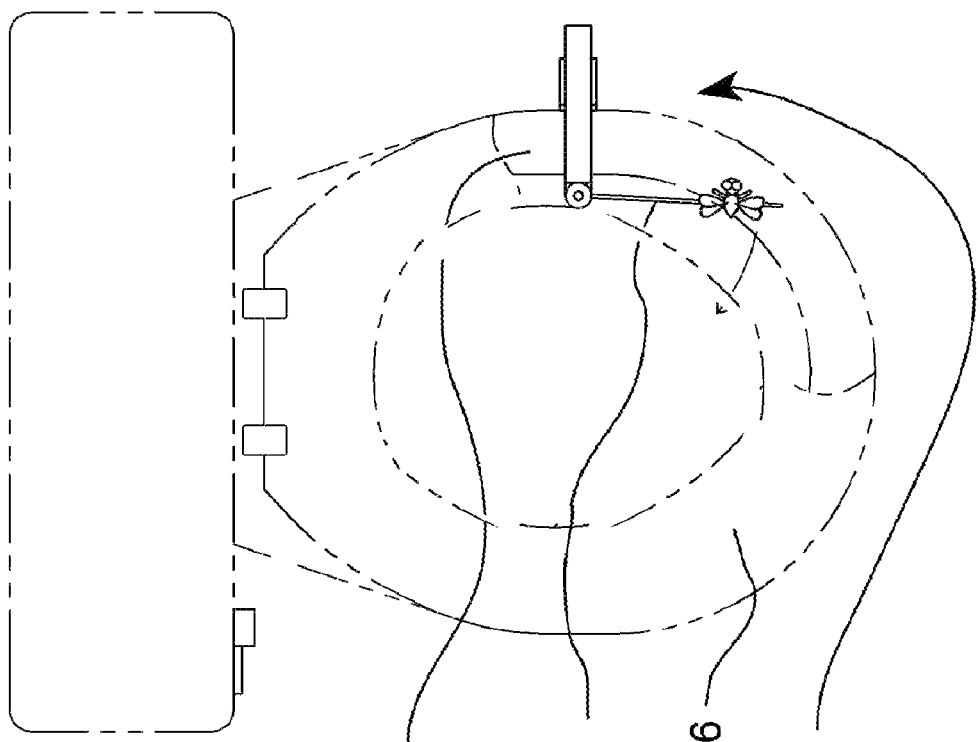
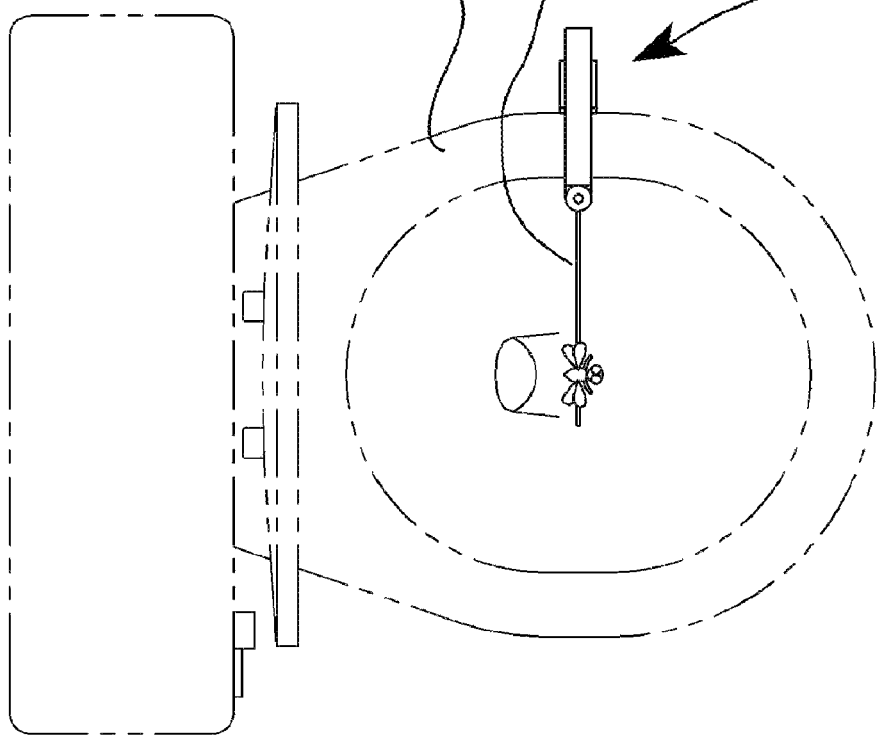

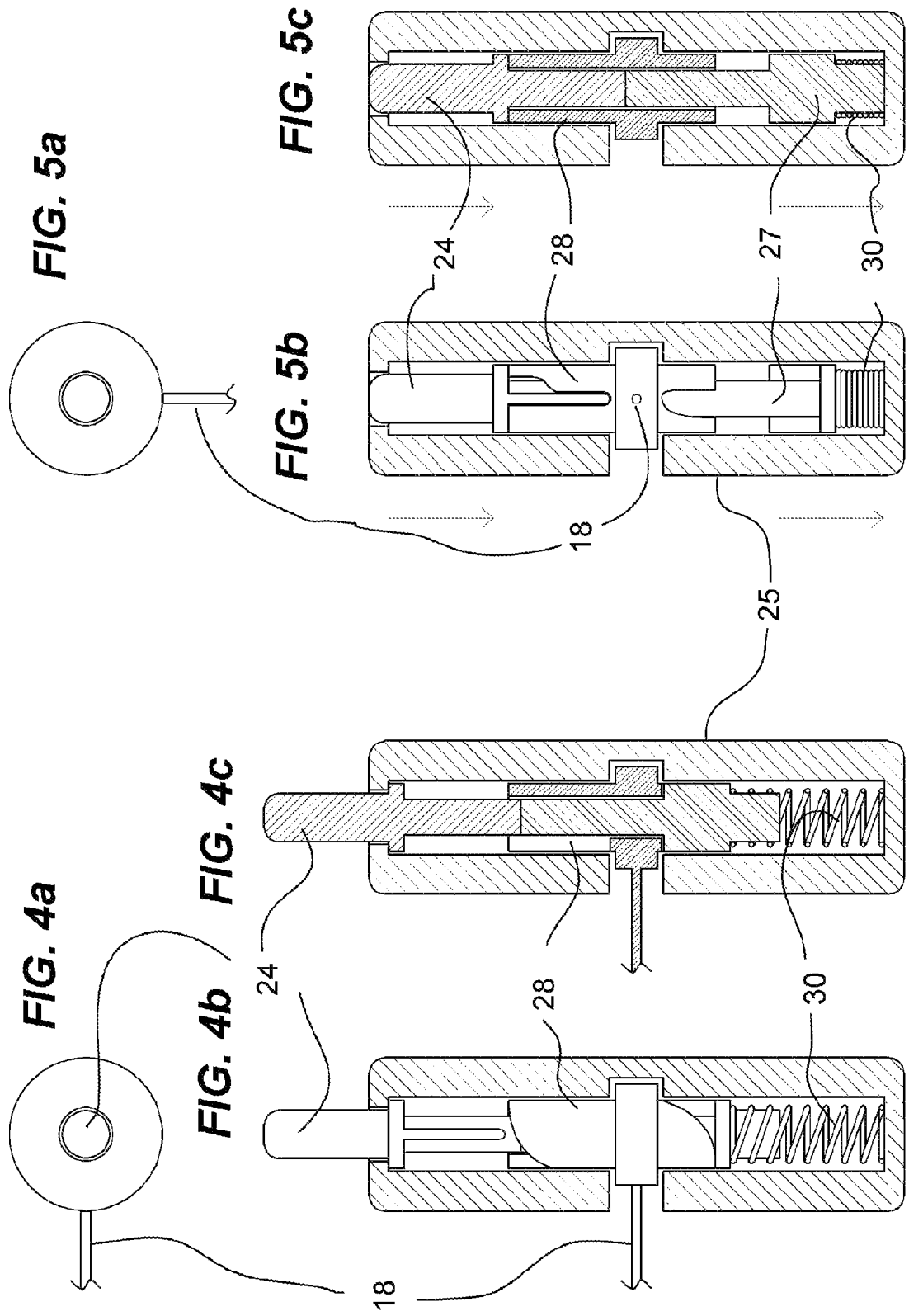

POTTY TRAINING DEVICE FOR BOYS

FIELD OF THE INVENTION

The present invention relates generally to toilet devices but more particularly to a device to train boys on how to use a toilet.

BACKGROUND OF THE INVENTION

There are many techniques that have been devised over the years to motivate young boys to pee without spraying all over the place but they don't offer much advantages over not giving any specific training. Public urinals in Singapore that have pictures of flies painted in them have been found to reduce cleaning by 80% simply because it gives something to aim at.

SUMMARY OF THE INVENTION

In view of the foregoing disadvantages inherent in the known devices now present in the prior art, the present invention, which will be described subsequently in greater detail, is to provide objects and advantages which are:

To provide for a device that trains boys by making it a game of skills.

To attain these ends, the present invention generally comprises a target member connected to an end portion of a bent rod member, the bent rod member connected to a rotating device. The rotating device being connected to a clamping member which is adapted to be removably attached to the bowl portion of the common toilet; the rotating device including a button member adapted to be depressed by an annular seat member of the toilet, such that when the annular seat member depresses the button member the rotating device is forced to rotate thereby rotating the bent rod and target with respect to the clamping member.

In a preferred embodiment, the rotating device includes a cam member that is mechanically interconnected with the bent rod member, and a biasing spring member; and the button member includes a plunger portion, such that when the button member is depressed by the annular seat member, it contacts and rotates the cam member and the bent rod member, and the plunger portion compresses the biasing spring member. When the annular seat member is lifted and the button member is released, the biasing spring member pushes up the plunger portion, the cam member, and the button, and thereby rotates the bent rod member back to its original position.

The bent rod member has two bends that are bent in opposite directions, thereby forming a shape resembling the letter S.

The clamping member includes a threaded member and a threaded fastener, such that the clamping member is adapted to securely grip onto a rim portion of the bowl portion of the common toilet.

The biasing spring member is formed as a coil spring.

The plunger portion is formed integrally with the button member.

The target member can be formed in the shape of an insect chosen from a list of insects that includes a fly.

A combination of a toilet member and a potty training device for removable attachment to a bowl portion of the toilet member; the combination comprising a toilet member including a bowl portion having a rim, and an annular seat member; and the potty training device comprising a target member connected to an end portion of a bent rod member. The bent rod member connected to a rotating device; the rotating device being connected to a clamping member which is removably attached to a rim portion of the bowl portion of the toilet member, such that the target member is positioned in the center of the bowl portion; the rotating device including a button member adapted to be depressed by the annular seat member of the toilet, such that when the annular seat member depresses the button member the rotating device is forced to rotate thereby rotating the bent rod and target with respect to the clamping member and thereby moving the target member out from the center of the bowl member and closer to a side wall of the bowl member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIGS. 1 *a-b* Front view of the invention in context and detail, respectively, of the invention.

FIGS. 3*a-b* Top views of the device in function and out of function, respectively.

FIGS. 4*a-c* Top, see-through and cutaway views, respectively, of the invention when the button is released.

FIGS. 5*a*-*c* Top, see-through and cutaway views, respectively, of the invention when the button is depressed.

DETAILED DESCRIPTION OF THE PREFERRED EMBODIMENT

Figures 2A, 2B:
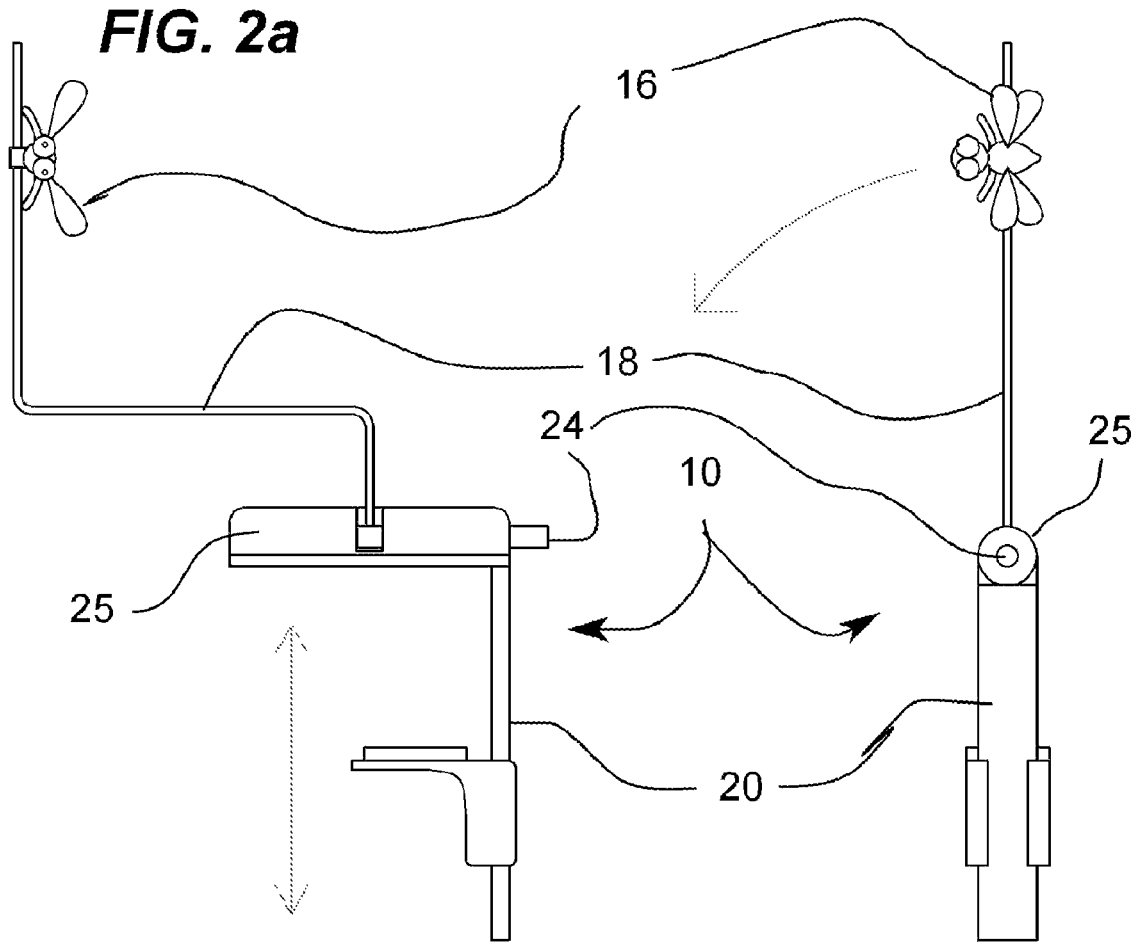
FIGS. 2*a-b* Front and top views, respectively, of the invention.

A potty training device (10) is installed within a bowl (12) of a toilet (14). The potty training device (10) consists of a target (16) releasably attached to a bent rod (18) which is pivotally attached to a clamping means (20). The clamping means (20) clamps onto a rim (22) of the bowl (12). When an annular seat (26) is lowered, it depresses a button (24) which forms part of a rotating device (25) and which pivots the bent rod (18) from the center of the bowl (12) (as seen in FIG. 3*a*) towards its side (as seen in FIG. 3*b*). When the annular seat (26) is raised, the button (24) is released and the bent rod (18) rotates so as to bring the target (16) towards the center of the bowl (12) (as seen in FIG. 3*a*).

In order to pivot the bent rod (18) between the two positions, the button (24) is either depressed or released. When depressed, the button (24) itself pushes downwardly against a cam member (28). The cam member (28) has the bent rod (18) extending perpendicularly thereof. The sloping shape of the cam member (28) in cooperation with the button (24) induces the rotation when the button (24) is pushed downwardly. A plunger (27) extends integrally from the button (24) and presses against a biasing means (30), preferably in the shape of an coil spring. The biasing means (30) pushes the button (24) upwardly when no pressure is applied, such as when the annular seat (26) is raised.

The target (16) can be of any shape, although it seems that flies seem to be a popular shape. The material is of course suited for its intended use which includes elastomers or resins.

The clamping means (20) is similar to clamping means as known in the art and need not be further discussed except that it is preferably variable in nature by way of a threaded means. The surfaces making contact with the rim (22) can optionally be made of peel off adhesives to increase adherence.

The invention claimed is:

1. A potty training device for removable attachment to a bowl portion of a common toilet; said potty training device comprising a target member connected to an end portion of a bent rod member;
   said bent rod member connected to a rotating device;
   said rotating device being connected to a clamping member which is adapted to be removably attached to said bowl portion of said common toilet; said rotating device including a button member adapted to be depressed by an annular seat member of said toilet, such that when said annular seat member depresses said button member said rotating device is forced to rotate thereby rotating said bent rod and target with respect to said clamping member.

2. The potty training device of claim 1, wherein said rotating device includes a cam member that is mechanically interconnected with said bent rod member, and a biasing spring member; and said button member includes a plunger portion, such that when said button member is depressed by said annular seat member, it contacts and rotates said cam member and said bent rod member, and said plunger portion compresses said biasing spring member;
   and such that when said annular seat member is lifted and said button member is released, said biasing spring member pushes up the plunger portion, said cam member, and said button, and thereby rotates the bent rod member back to its original position.

3. The potty training device of claim 1, wherein said bent rod member has two bends that are bent in opposite directions, thereby forming a shape resembling the letter S.

4. The potty training device of claim 1, wherein said clamping member
   includes a threaded member and a threaded fastener, such that said clamping member is adapted to securely grip onto a rim portion of said bowl portion of said common toilet.

5. The potty training device of claim 2, wherein said biasing spring member is formed as a coil spring.

6. The potty training device of claim 2, wherein said plunger portion is
   formed integrally with said button member.

7. The potty training device of claim 1, wherein said target member can be formed in the shape of an insect chosen from a list of insects that includes a fly.

8. A combination of a toilet member and a potty training device for removable attachment to a bowl portion of said toilet member; said combination comprising a toilet member including a bowl portion having a rim, and an annular seat member; and said potty training device comprising a target member connected to an end portion of a bent rod member;
   said bent rod member connected to a rotating device, said rotating device being connected to a clamping member which is removably attached to a rim portion of said bowl portion of said toilet member, such that said target member is positioned in the center of said bowl portion, said rotating device including a button member adapted to be depressed by said annular seat member of said toilet, such that when said annular seat member depresses said button member said rotating device is forced to rotate thereby rotating said bent rod and target with respect to said clamping member and thereby moving said target member out from the center of said bowl member and closer to a side wall of said bowl member.

9. The potty training device of claim 8, wherein said rotating device includes a cam member that is mechanically interconnected with said bent rod member, and a biasing spring member; and said button member includes a plunger portion, such that when said button member is depressed by said annular seat member, it contacts and rotates said cam member and said bent rod member, and said plunger portion compresses said biasing spring member; and such that when said annular seat member is lifted and said button member is released, said biasing spring member pushes up the plunger portion, said cam member, and said button, and thereby rotates the bent rod member back to its original position at the center of said bowl member.

10. The potty training device of claim 8, wherein said bent rod member has two bends that are bent in opposite directions, thereby forming a shape resembling the letter S and thereby positioning said target member in a position that is lower than said rim portion and inside said bowl portion.

11. The potty training device of claim 8, wherein said clamping member includes a threaded member and a threaded fastener, such that said clamping member is adapted to securely grip onto said rim portion of said bowl portion of said toilet.

12. The potty training device of claim 9, wherein said biasing spring member is formed as a coil spring.

13. The potty training device of claim 9, wherein said plunger portion is
    formed integrally with said button member.

14. The potty training device of claim 8, wherein said target member can be formed in the shape of an insect chosen from a list of insects that includes a fly.

* * * * *